R. E. HELLMUND.
CONTROL SYSTEM.
APPLICATION FILED NOV. 7, 1917.
1,314,517. Patented Sept. 2, 1919.
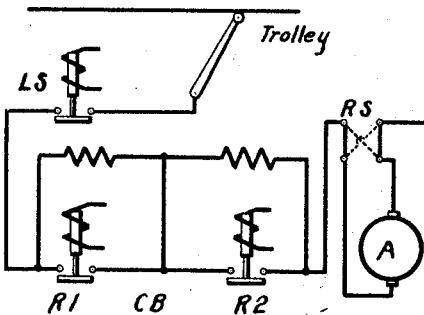
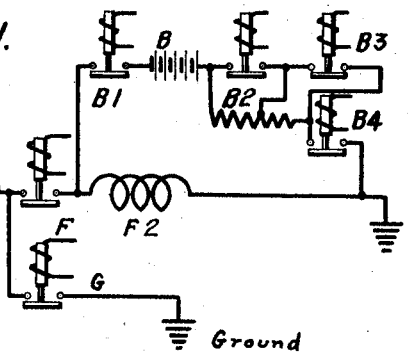
Fig. 1.
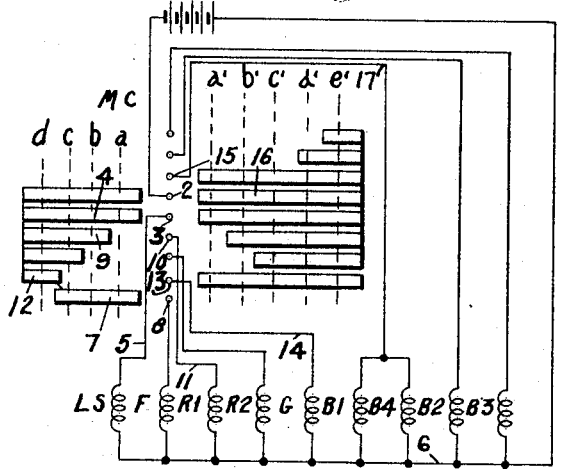
Fig. 2.
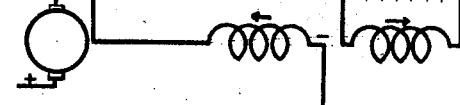
Fig. 3.
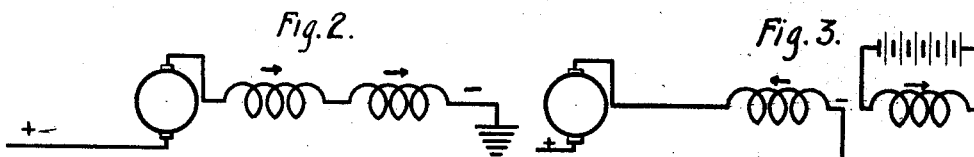
Fig. 4. Fig. 5.
WITNESSES:
Ed V Herron
W. R. Coley
INVENTOR
Rudolf E. Hellmund.
BY
[signature]
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,314,517.     Specification of Letters Patent.     Patented Sept. 2, 1919.

Original application filed September 8, 1914, Serial No. 860,612. Divided and this application filed November 7, 1917. Serial No. 200,658.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Systems, of which the following is a specification, this application being a division of my copending application, Serial No. 860,612, filed September 8, 1914.

My invention relates to systems of control, and it has special reference to electric railway systems of the type that are adapted to regeneratively supply current to the supply circuit when the motors embodied in the system are driven by the momentum of the vehicle.

One object of my invention is to provide a relatively simple, inexpensive and effective means of the above-indicated character which shall secure to the system all the familiar advantages of regenerative systems.

More specifically stated, it is the object of my invention to provide, in a system of the class under consideration, a variable resistor that is employed for regulating purposes and relatively quick-acting means for automatically or inherently compensating for such variation.

Heretofore electric railway systems employing regeneration have encountered certain difficulties because of voltage fluctuations in the supply circuit. Regeneration has been effected in many instances by exciting the motor field magnet winding by a battery or other suitable source and connecting the motor to the supply circuit when the current through the field magnet winding has been regulated to a predetermined value to cause the voltage generated by the momentum-driven motor to exceed the supply-circuit voltage by a certain value. Such a system will operate quite satisfactorily while the supply-circuit voltage remains substantially constant. However, if the voltage should decrease suddenly, for example, the regenerated current would assume a relatively high value which might be harmful to the motor, and, at the same time, might cause braking torques which would be undesirable, for other reasons. The opposite action takes place if the supply-circuit voltage suddenly increases, as will be understood. Such conditions may be avoided by regulation of the field current of the motor by variation of the battery voltage. However, so far as I am aware, no simple and effective automatic switching apparatus which will act quickly enough to give proper regulation has been devised.

According to my present invention, therefore, I provide a dynamo-electric machine with preferably a multipart field magnet winding, such, for example, as that employed in "field control" systems of a familiar type, one part of which is connected to a suitable auxiliary source of energy, such as a storage battery or motor-generator set, for aiding regenerative operation of the armature, and the other portion of which is connected in series with the machine armature during regeneration, the two portions of the field winding being disposed to act in opposition to each other. With such a system, if the supply-circuit voltage suddenly decreases, the regenerated current will correspondingly tend to increase, thereby increasing the effect of that portion of the field winding which is connected in circuit with the machine armature and thus decreasing the effective value of field ampere-turns or flux in the motor. The increase of the regenerated current will, consequently, be much less than would be the case if the various portions of the field winding were not disposed to oppose each other. Conversely, if the supply-circuit voltage suddenly increases, an opposite action on the regenerated machine current will occur. As before noted, my system will not embody any special complicated set of connections, inasmuch as a machine of the well-known "field-control" type may readily be adapted for use in regeneration.

The inherent regulating action just recited is relatively quick-acting by reason of the direct variation in the excitation of the regenerating machine, and thus the armature current is maintained within relatively narrow limits.

In the accompanying drawing, Figure 1 is a diagrammatic view of the main circuits of a system of control embodying my invention; Fig. 2 is a diagrammatic view of a suitable auxiliary control system for manipulating the various motor-controlling switches shown in Fig. 1, in accordance with the sequence chart of well known form that is illustrated in Fig. 3; and Figs. 4 and 5 are simple diagrammatic views illustrating certain sets of connections of the system shown in Fig. 1.

Referring to Fig. 1 of the drawing, the system here shown comprises a supply-circuit conductor marked "Trolley"; a return-circuit conductor marked "Ground"; a dynamo-electric machine provided with an armature A and a field magnet winding comprising two parts F1 and F2; an auxiliary source of energy, such as a battery B, for exciting the portion F2 of the field winding, under predetermined conditions; a reversing switch RS, of familiar form, for reversing the electrical relations of the armature A with respect to the field winding; a plurality of motor-controlling switches LS, F, and G; an accelerating resistor, the sections of which are respectively adapted to be short-circuited by switches R1 and R2; a plurality of switches B1 and B4 for controlling the connections of the battery B; and a battery-circuit resistor, the sections of which are respectively adapted to be short-circuited by switches B2 and B3.

Referring now to Fig. 2, the auxiliary control circuits shown comprises a suitable master controller MC which is adapted to assume a plurality of motor-controlling positions $a$ to $d$, when operated in one direction, during acceleration of the motor, and a plurality of positions $a'$ to $e'$, when operated in the other direction, during regeneration; a suitable auxiliary source of energy, such as a control battery CB; and the actuating coils of the various switches illustrated in Fig. 1.

Assuming the various parts of the system to occupy the positions shown in the drawing, the operation of the system may be described as follows: When the master controller MC is moved to its first position $a$, a circuit is established from one terminal of the control battery CB through conductor 1, control fingers 2 and 3, which are bridged by a contact segment 4 of the master controller, conductor 5, the actuating coil of the switch LS, and the conductor 6 to the opposite side of the battery. Another circuit is established from an energized contact segment 7 of the master controller through control finger 8, the actuating coil of the switch F and the conductor 6. The motor is thus connected across the supply circuit, with the entire accelerating resistor in series therewith, and the two portions F1 and F2 of the field magnet winding are connected in series-circuit relation.

If the master controller is moved to its position $b$, an energized contact segment 9 engages a control finger 10, from which point the circuit is completed through conductor 11 and the actuating coil of the resistor-short-circuiting switch R1 to the negative conductor 6. Upon the actuation of the master controller to its position $c$, the actuating coil of the switch R2 is similarly energized. The various portions of the accelerating resistor are thus successively short-circuited to effect a gradual acceleration of the motor, as is customary practice. If the master controller is moved to its final running position $d$, an energized contact segment 12 engages a control finger 13, whence circuit is established through conductor 14 and the actuating coil of the switch G to the negative control conductor. Substantially simultaneously with the engagement of the segment 12 and the finger 13, the segment 7 disengages the finger 8: the switch G is thus closed and the switch F is opened, thereby excluding the portion F2 of the field magnet winding from circuit to effect a further acceleration of the motor, in accordance with well-known principles.

Assuming that the motor is operating above a predetermined speed, which is suitable for regenerative purposes, and that the master controller is then moved to its position $a'$, a circuit is established from control fingers 2 and 15, which are bridged by a contact segment 16, conductor 17, and the actuating coils of the switches B1 and B4 to the conductor 6. The battery B is thus connected in circuit with the entire battery-circuit resistor across the portion F2 of the field magnet winding to energize it in a predetermined direction, for aiding the regenerative operation of the armature. The switches LS and G are also energized in the position $a'$ of the master controller, in a manner similar to that hereinbefore described. The armature A, portion F1 of the field magnet winding and the entire accelerating resistor are thus connected to regeneratively supply current to the supply circuit, the current through the portion F1 of the field winding being in such a direction as to oppose the action of the predominating portion F2, which is excited by the battery B at a predetermined relatively constant voltage. If the controller is successively moved to its position $b'$ and $c'$, the switches R1 and R2 are progressively closed in a manner similar to that already pointed out.

In order to maintain a substantially constant regenerated current as the motor speed decreases, the master controller may be successively moved to its positions $d'$ and $e'$, thereby respectively closing the battery-circuit resistor short-circuiting switches B2 and B3, and correspondingly increasing the strength of the field current in the portion F2 of the field winding, to increase the total effective field flux of the machine.

The connections of the final running position of the motor during acceleration are indicated in Fig. 4, the direction of the current in the two portions of the field winding being indicated by arrows. The final regenerative connections of the motor are similarly indicated in Fig. 5.

Since the operation of the system with respect to fluctuations of the supply-circuit voltage has been already set forth, no further description thereof will be given. It will be understood that, although I have shown and described my invention in connection with a simple and familiar form of control, the invention is not restricted to any particular system.

Consequently, I do not wish to be restricted to the specific circuit connections or arrangement of parts herein set forth, but desire that only such limitations shall be imposed as are indicated in the appended claims.

I claim as my invention:

1. In a system of control, the combination with a supply circuit and a dynamo-electric machine adapted for both acceleration and regeneration, of a main-circuit resistor connected in circuit during the initial portions of both the accelerating and the regenerative periods, and switching means for reducing the value of said resistor in steps, the field-winding connections being so arranged during regeneration as to inherently counteract the current increases caused by such reduction.

2. In a system of control, the combination with a supply circuit and a dynamo-electric machine having an armature and a plural-section field-magnet winding and adapted for both acceleration and regeneration, of a main-circuit resistor employed during the initial portions of both the accelerating and the regenerative periods, and switching means for reducing the value of said resistor, said field-winding sections being differentially disposed during the regenerative period, whereby machine voltage fluctuations are inherently maintained within relatively narrow limits.

3. In a system of regenerative control, the combination with a supply circuit and a dynamo-electric machine, of an armature-circuit resistor connected in circuit during the initial period of each regenerative operation, means for reducing the value of said resistor in steps, and means for inherently counteracting the current increases caused by such reduction.

4. In a system of regenerative control, the combination with a supply circuit and a dynamo-electric machine, of an armature-circuit resistor, switching means for reducing the value of said resistor in steps under initial regenerative conditions, and means, comprising relative armature and field-winding connections, for inherently varying the effective field flux during such reduction to maintain the armature current within relatively narrow limits.

In testimony whereof, I have hereunto subscribed my name this 15th day of Oct. 1917.

RUDOLF E. HELLMUND.

Copies of this patent may be obtained for five cents each, by addressing the "Commissioner of Patents, Washington, D. C."